United States Patent
Panesar

(10) Patent No.: US 7,457,900 B2
(45) Date of Patent: Nov. 25, 2008

(54) METHOD FOR DISCOVERING AND PARTITIONING PCI DEVICES

(75) Inventor: Kiran Panesar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 11/471,824

(22) Filed: Jun. 20, 2006

(65) Prior Publication Data

US 2007/0294444 A1    Dec. 20, 2007

(51) Int. Cl.
G06F 13/00 (2006.01)
H05K 7/10 (2006.01)
(52) U.S. Cl. ................................. 710/104; 710/301
(58) Field of Classification Search .................. None
See application file for complete search history.

(56) References Cited

U.S. PATENT DOCUMENTS 6,148,355 A * 11/2000 Mahalingam ............... 710/104
2004/0181625 A1 * 9/2004 Armstrong et al. .......... 710/200
2006/0168377 A1 * 7/2006 Vasudevan et al. .......... 710/104
2007/0136504 A1 * 6/2007 Wu ............................. 710/302

OTHER PUBLICATIONS

PCI Special Interest Group; "PCI Local Bus Specification"; PCI Special Interest Group; Revision 2.1; Jun. 1, 1995; p. 22.*
The Impact of Performance Asymmetry in Emerging Multicore Architectures, S. Balakrishnan, et al., http://www.cs.wisc.edu/~isca 2005/papers/08A-03.PDF.

* cited by examiner

Primary Examiner—Paul R. Myers
Assistant Examiner—Ryan M Stiglic
(74) Attorney, Agent, or Firm—Blakely, Sokoloff, Taylor & Zafman LLP

(57) ABSTRACT

Embodiments provide an efficient system of device configuration and detection for a peripheral component interconnect (PCI) system. Each connected device provides a descriptor and is accessed at a predetermined address. The device is then configured by the operating system based on the device descriptor and assigned a device address for further operation. The system also supports the assignment of devices to different partitions in the computer system.

20 Claims, 7 Drawing Sheets

METHOD FOR DISCOVERING AND PARTITIONING PCI DEVICES

BACKGROUND

1. Field of the Invention

The invention relates to a method and apparatus for configuring devices attached to an interconnect in a computer system. Specifically, embodiments of the invention provide an improved device attachment method and apparatus for peripheral component interconnect (PCI) type interconnects.

2. Background

A computer, such as a desktop computer, workstation, server or similar machine, is started with a boot up sequence. During the boot up sequence the components of the computer system are initialized and prepared for operation. The length of the boot up sequence affects the user experience and productivity. A long boot up sequence frustrates a user and decreases the user's productivity.

Many components in a computer system are connected through an interconnect such as a shared bus or a point to point communication system. These interconnect systems allow the communication of data between the components of the computer system. For example, they allow the communication of data from a network card to a central processing unit or to the system memory. A computer system may have multiple interconnect systems connecting different sets of components. The different interconnect systems may have different architecture, protocols, speed and other differences in characteristics.

A commonly utilized interconnect system is a peripheral component interconnect (PCI). PCI type interconnects include several separately defined systems including conventional PCI (e.g. PCI 3.0), PCI-X and PCI-Express (PCI-e) defined by the PCI special interest group (PCI-SIG). Each of the PCI type interconnects discover attached devices by scanning the entire configuration space. The configuration space is an address space that is reserved for input/output (I/O) devices in the system. The entire configuration space is checked to determine, which devices, if any, are connected to the computer system. The configuration space is typically sparsely populated and scanning the entire configuration space is a slow process.

When a device is found in the configuration space, specialized configuration transaction packets or configuration cycles are utilized to identify and configure the device. These specialized packets and cycles add a level of complexity to the architecture of the interconnect and devices to support these configuration packets and cycles. The use of specialized configuration packets and cycles also makes it difficult to treat processor cores as devices, because the packets and cycles are generated by the (PCI controller in the I/O) chipset.

Some devices may have their device operational registers accessed by memory read and write operations. These devices are referred to as memory mapped and the address space is referred to as memory mapped I/O (MMIO). One or more registers in the configuration space contain the MMIO base address registers (BARs).

The PCI type interconnect system is designed for use with a single partition. A partition refers to a set of processor cores, memory and I/O resources of a computer system. A single operating system executes and manages resources for each partition of the computer system.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

In the following description, for the purpose of explanation, numerous specific details are set forth in order to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1:
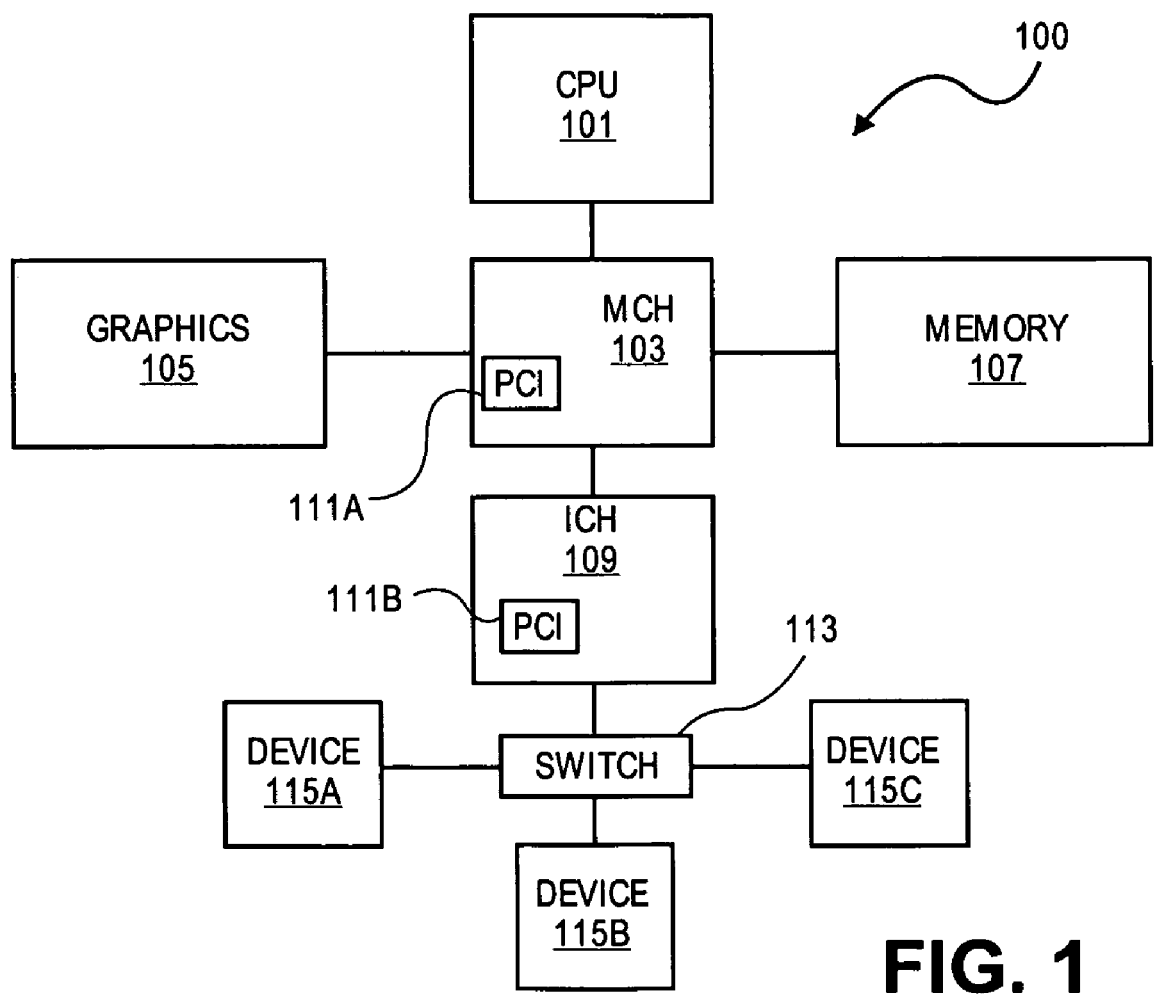
FIG. 1 is a diagram of one embodiment of a PCI type interconnect system with efficient device detecting and partition assignment.

FIG. 1 is a diagram of one embodiment of a computer system 100 having a PCI type interconnect with an efficient discovery process and partition support. The computer system 100 includes a central processing unit (CPU) 101. The CPU 101 may be any type of processor including a reduced instruction set processor or complex instruction set processor. In one embodiment, the CPU 101 may have a single processor core. In another embodiment, the CPU 101 may include multiple processor cores. The CPU 101 may be on a separate die or may share a die with other computer system components.

The CPU 101 may communicate with other computer system components through a memory control hub (MCH) 103 or similar device. The MCH 103 may be a single component or a set of components. For example, the MCH 103 may be a chipset. In one embodiment, the MCH 103 is on a separate die and package from the CPU 101. In another embodiment, the MCH 103 may be on the same die and packaged together with the CPU 101. The MCH 103 may support communication between the CPU 101 and a graphics processor 105, system memory 107 and other system devices 115a-115c. In one embodiment, the MCH 103 may include a PCI type controller 111a. The PCI type controller 111a may also be referred to as a root complex. For example, the PCI type controller 111a may be a PCI-e controller or other system bus controller providing communication with the graphics processor 105 or similar system components.

In one embodiment, the graphics processor 105 may be a separate component on a separate printed circuit board (card) in communication with the CPU 101 through an MCH 103. The graphics processor 105 card may support communication using a PCI type interconnect. In another embodiment, the graphics processor 105 may be on the same printed circuit board, mainboard, die or similarly interconnected with the MCH 103.

The computer system memory 107 may be dynamic or static random access memory (RAM). The system memory 107 may function as the main workspace for the CPU 101. The system memory 107 may communicate with the CPU 101 and other system components through the MCH 103.

In one embodiment, the computer system 100 may include an input/output (I/O) control hub (ICH) 109. The ICH 109 may be a separate component or set of components from the MCH 103. In another embodiment, the ICH 109 may be integrated with the MCH 103. The ICH 109 may include a PCI type controller 111b for managing data communication with devices 115a-115c. The PCI type controller 111b may be a root node or similar component able to send and receive messages to the device 115a-115c.

191 A single device 115a or multiple devices 115a-115c may be connected to the PCI type interconnect. The PCI type interconnect may be a conventional PCI interconnect, such as a PCI 3.0 interconnect, a PCI-X, PCI-e or similar PCI interconnect system. For example, devices 115a-115c may be connected by point to point connections with a switch 113 and the root node 111b in PCI-e implementation. Devices 115a-115c may include networking cards, graphics cards, audio cards, additional processors and similar devices.

Figure 2:
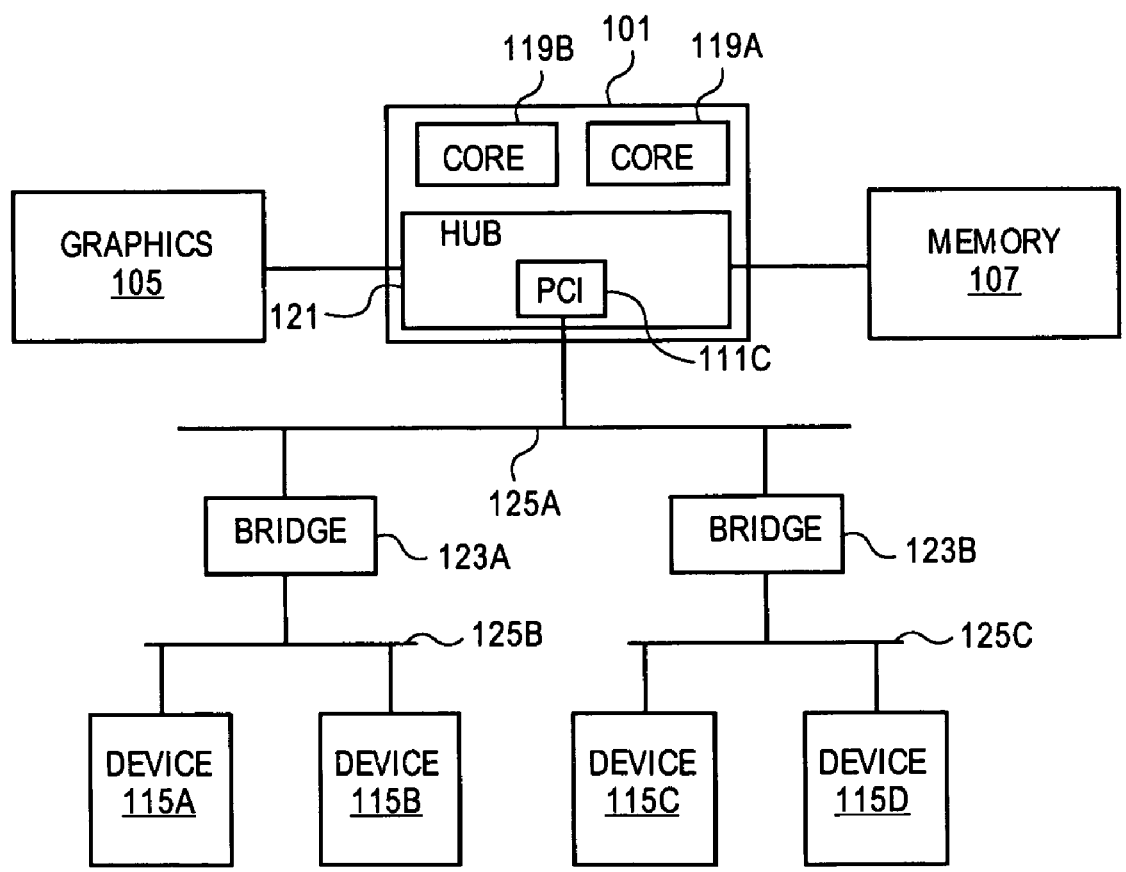
FIG. 2 is a diagram of another embodiment of a computer system including the PCI type interconnect system with efficient device detecting and partition assignment.

FIG. 2 is a diagram of another embodiment of a computer system including a PCI type interconnect with efficient configuration and partition support. The computer system 100 may include a CPU 101 having multiple cores 119a, 119b. The CPU 101 and hub controller 121 may be placed on the same die and in the same packaging. The hub 121 may be an integrated hub having the components of an MCH and ICH. The hub 121 may provide communication between the cores 119a, 119b and the graphics processor 105, system memory 107 and other system components. In another embodiment, the hub 121 may be a part of a separate package from the CPU 101. The hub 121 may be referred to as a switch. The hub 121 may include a PCI type controller 111c providing communication with peripheral devices 115a-115d and other system components.

In one example embodiment, the PCI controller 111c may be part of a conventional PCI system. The conventional PCI system may include a set of shared PCI buses 125a-c. The PCI controller 111c may communicate over a first bus 125a with PCI bridges 123a and 123b, which provide communication with devices 115a-115d over buses 125b and 125c. A similar configuration may be used for a PCI-e system.

The PCI type system may be conceived as a tree based system. The PCI controller 111c may be treated as a root node. The buses 125A leading to the bridges or between other nodes may be conceived as tree edges. Bridges 123A and 123B may be conceived as internal or interior nodes. Devices 115A-115D may be conceived of as leaf nodes or end points.

Figure 3:
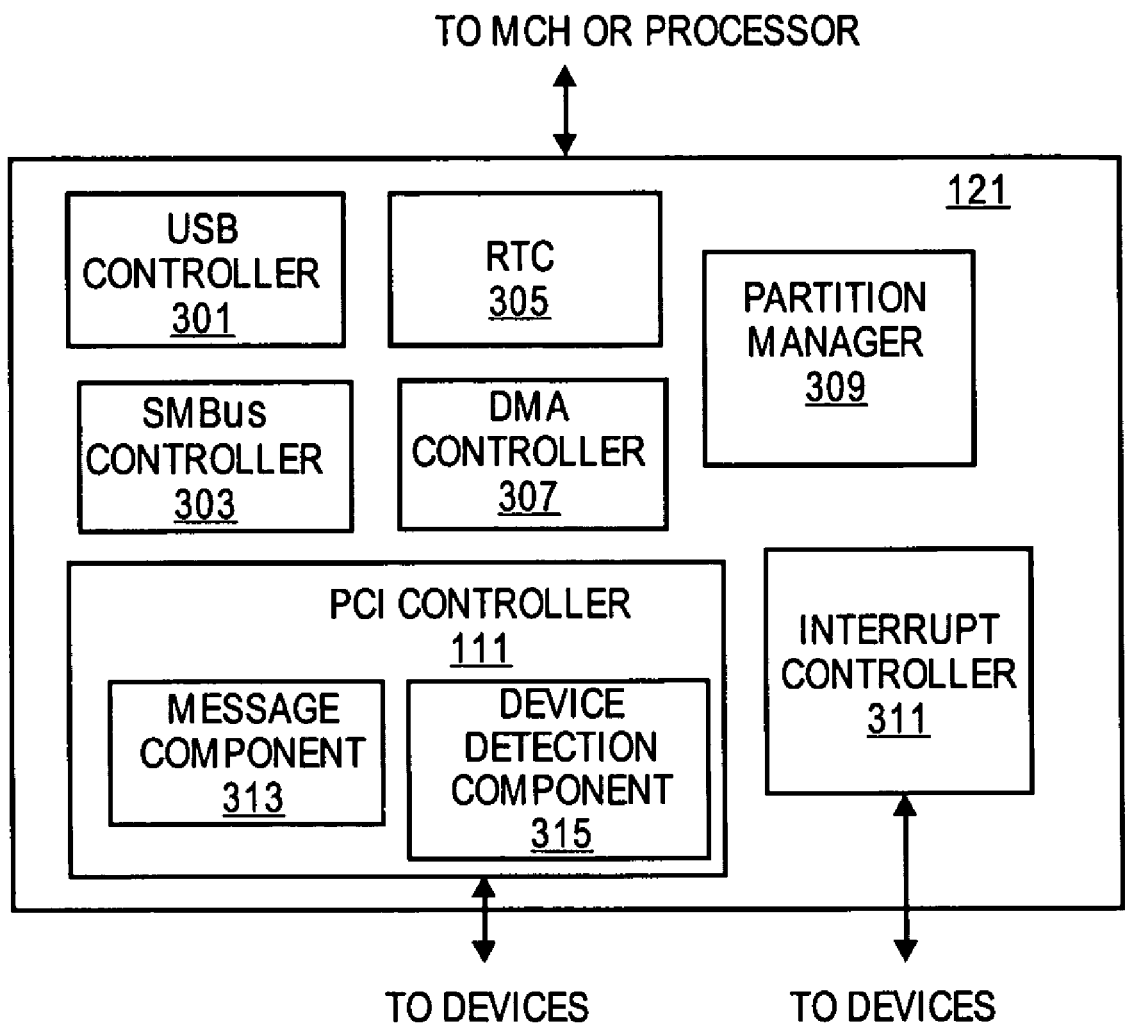
FIG. 3 is a diagram of one embodiment of an I/O hub including the PCI type interconnect system with efficient device detecting and partition assignment.

FIG. 3 is a diagram of one embodiment of a hub controller 121. The hub controller 121 includes interfaces and controllers for supporting communication between different types of devices in the computer system. The hub controller 121 may be an integrated MCH and ICH or either an MCH or ICH. The hub controller 121 may include subcomponents that share the same die or may be part of a chipset or a similar collection.

The hub controller 121 may include a universal serial bus (USB) controller 301, a real time dock (RTC) generator 305, a system management bus (SMBus) controller 303, a direct memory access (DMA) controller 307, interrupt controller 311 and similar components. The USB controller 301 facilitates communication with devices connected over a USB. The RTC 305 provides a clock signal to other system components. The SMBus controller 303 facilitates communications with system components over the system management bus. The interrupt controller 311 receives and forwards interrupts received from system devices.

In one embodiment, the computer system includes a partition manager 309. The partition manager 309 sets up and tears down partitions and determines the partition to which a device is assigned. The partition manager 309 may work in conjunction with operating systems in each partition to determine the appropriate partition for each device. The partition manager 309 may be implemented in software on the CPU 101 or core 119 (e.g. microcode, assembly language, or a higher level language), or in firmware executed by the hub controller 121, an application specific integrated circuit (ASIC) or similarly implemented.

In one embodiment, the hub controller 121 includes a PCI controller 111. The PCI controller 111 may be a root node, bridge or similar component. The PCI controller 111 manages the communication of data from the hub controller 121 to the devices on the PCI system directly or through intermediate switches, bridges and similar devices. The PCI controller 111 may include a messaging subcomponent 313 that manages the sending and receiving of data from between the hub 121 and the PCI interconnect. The PCI controller 111 may include a device detection subcomponent 315. The device detection subcomponent 315 may manage the handling of device detection and configuration. The messaging subcomponent 313 may manage or carry out communication operations between the PCI controller 111 and the devices as describes in detail herein below. Similarly, the device detector subcomponent 315 may handle the detection operation described in detail herein below.

Figure 4:
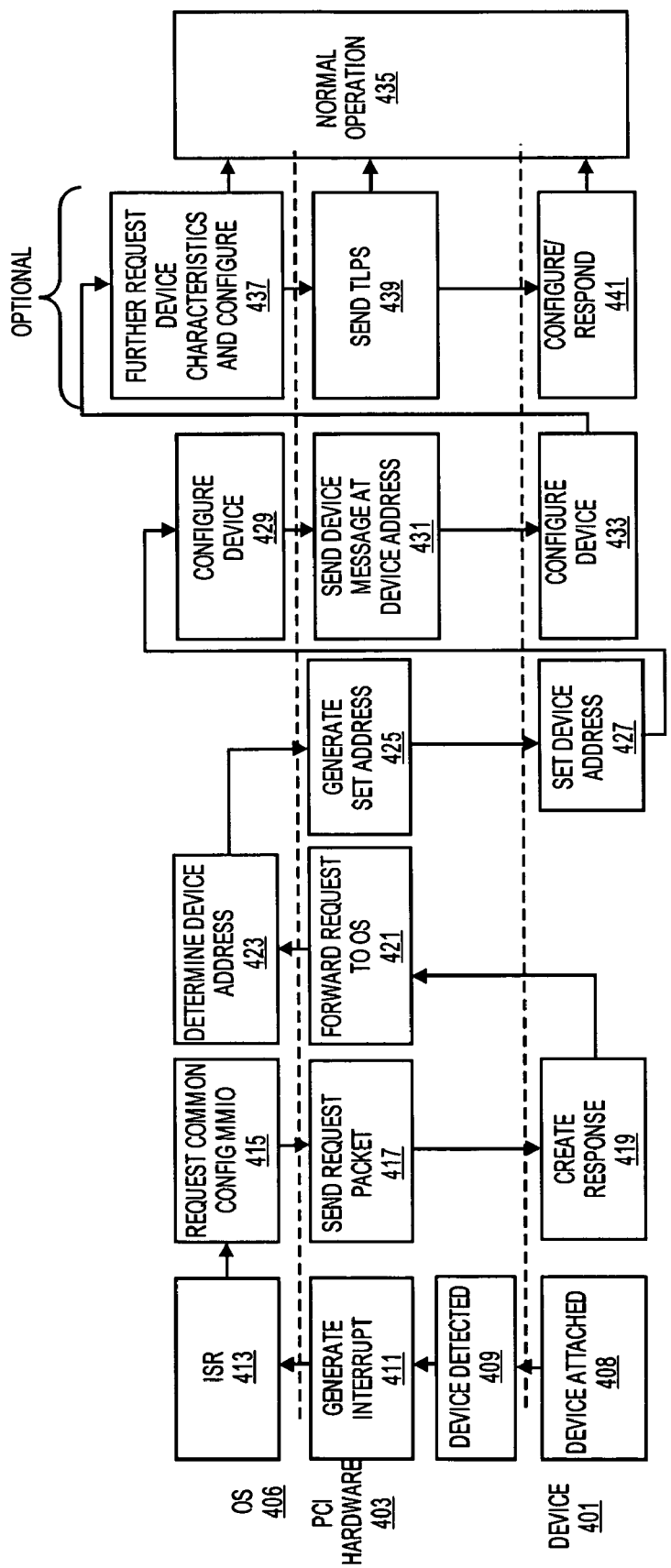
FIG. 4 is a diagram of one embodiment of a process for efficiently configuring devices in a PCI type interconnect system.

FIG. 4 is a diagram of one embodiment of a process for managing the attachment of devices to the PCI system. The process spans operations of the attached device 401, the hardware 403 of the PCI system, such as bridges, switches and other components, and the operating system (OS). The process may be initiated when a device is attached to the PCI system or when the computer system is in the boot up process (block 407). In one embodiment, the device may generate an interrupt to signal the computer system of the attachment. This may result in a bit being set in a status register of the PCI controller, switch or bridge. The device is automatically accessible at a common configuration memory mapped I/O address (MMIO). This MMIO address is a common MMIO address used by all new devices prior to configuration by the system.

In one embodiment, devices may be configured in the order of their position relative to the CPU. Devices and components that are closest to the CPU or CPU cores may be assigned the common configuration MMIO first. Devices attached to the root complex or PCI type controller may be the next assigned to the common configuration MMIO. Devices or components that are the same distance from the CPU or CPU cores may be handled in the order of their connection to the system or in a similar order. In one embodiment, if a device is itself a switch or hub then device configuration and discovery may continue for the devices attached to the switch or hub.

In one embodiment, this process may take the form of a tree walk. A tree walk may be an algorithm for discovering and configuring devices in a device tree. The tree walk may be conducted similar to a depth first or breadth first search. The device tree may be a hierarchy of PCI type switches and devices rooted at the PCI type controller or root complex.

The common starting address or common configuration address may be any MMIO address. This address may be programmed or hardwired to the devices or may be supplied to the devices by the computer system or similarly obtained. In another embodiment, the device may be detected by polling the common configuration MMIO address or through similar detection means utilizing the common configuration MMIO address for communication.

The PCI hardware 403 detects the presence of the device on the PCI system (block 409). The PCI hardware 403 may detect the device by receiving an interrupt from the device, monitoring status bits in status registers, polling the device through the common configuration MMIO or through similar mechanisms. In response to detecting the device, the PCI hardware 403 may generate an interrupt for the OS 405 (block 411). The interrupt may be a system management interrupt (SMI) or similar interrupt. In one embodiment, the PCI hardware 403 may simply propagate the interrupt generated by the device forward to the OS 405. In another embodiment, the PCI hardware 403 may signal the OS 405 using any other communication mechanism.

In response to receiving an interrupt or similar communication from the PCI hardware 403, the OS 405 executes an interrupt service routine (ISR), and optionally followed by a similar program, such as deferred procedure calls (DPCs) (block 413). The ISR clears the interrupt and generates a read request or similar request for data at the common configuration MMIO address (block 415). The request may be represented by data structures in shared system memory. These data structures may be chained for efficiency.

Figure 6A:
FIG. 6A is a diagram of one embodiment of a request message.
Figure 6B:
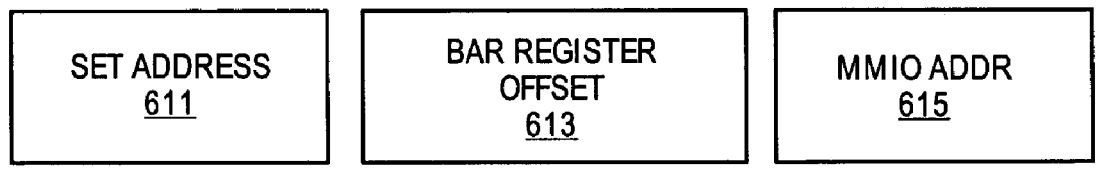
FIG. 6B is a diagram of one embodiment of a set address message.
Figure 6C:
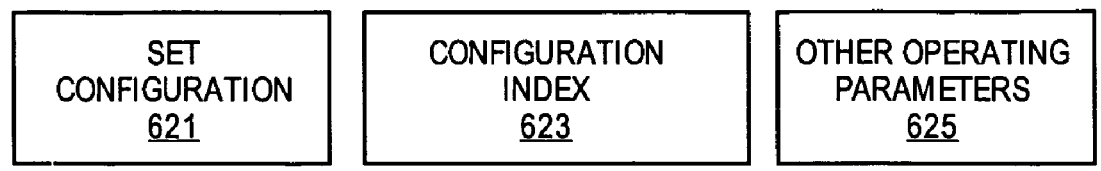
FIG. 6C is a diagram of a one embodiment of a configuration message.

FIGS. 6A-C are diagrams of one embodiment of requests created by the operating system and stored in shared memory. Requests may be used by an operating system to control the operation of the PCI type controller, such as a PCI-e root complex. The PCI type controller then translates these requests to corresponding TLPs shown in FIG. 7. A request may be a reset device request, a read descriptor request, a set address request, a set configuration request or a data request. For example, to read a descriptor for a newly attached device, the OS will put a "read descriptor" request in system memory. The PCI-e controller will read this request, and generate a "Read config Descriptor" TLP. The device response is stored at the system memory address indicated in the "read descriptor" request.

FIG. 6A is a diagram of an example embodiment of a read descriptor request. This request may include a type identifier 601, a descriptor index MMIO address 603 and a system memory address 605. This request may be used when a device is connected to the system. The system memory address may be the storage location for the descriptor that is requested.

FIG. 6B is a diagram of one example embodiment of a set address request. The set address requester may include a set address type identifier 611, a base address register (BAR) offset 613 and a MMIO address 615. This requestor may be used to set the BAR of a device.

FIG. 6C is a diagram of one embodiment of a set configuration request. The set configuration request may include a set configuration type indicator 621, a configuration index 623 and a section for other operating parameters to be set 625. This request may be used to configure a device.

The device and OS may agree on a common configuration MMIO addresses, which is predetermined, and may be mandated by a PCI standard. For example, this may be MMIO address zero. In one embodiment, the OS programs this predetermined address into the PCI type controller. When a device is first attached, the PCI controller may inform the device of this common configuration MMIO address e.g. by writing it to a (bus, device, function) address. In another embodiment, the command configuration MMIO may be well known and the device may be designed to utilize it.

Returning to the discussion of FIG. 4, a request is received by the PCI hardware 403, which generates a read request transaction layer packet (TLP) to the common configuration MMIO address, or similar read request, requesting a common device descriptor (block 417). The device 401 receives the request or packet and generates a response providing a device descriptor (block 419). The device descriptor may include a vendor identification number (ID), a device ID, model number, serial number and similar information identifying the device. The descriptor may include additional data regarding the characteristics, resource requirements and similar information related to the device. The response data may include any combination or subset of the descriptor data. The description data may have any format and content. The description may be a standardized format or may vary from device to device. The PCI hardware 403 receives this descriptor data and forwards it to the OS 405.

The operating system 405 receives the descriptor data and determines a device address for the device 401 (block 423). Any algorithm may be used to determine the device address. The determination of the device address may be based on device type, device resource requirements, other devices present in the system and similar factors. The device address may be a MMIO address through which the device may be accessed. The OS 405 may inform the device about the MMIO base address by issuing a set address command to the PCI controller. The PCI hardware 403 may generate a set address operation (TLP) and send data message or write transaction to the device 401 (block 425). The device 401 receives this data message or transaction and sets its device address to the MMIO address designated configuration MMIO (block 427). The device 401 subsequently communicates through the MMIO address designated by the OS 405 automatically freeing the common configuration MMIO for use by other newly attached or unconfigured devices.

The OS 405 may determine additional operating and configuration parameters for the device based on the descriptor data and system resources. The OS 405 may generate configuration queries. The device may respond with device descriptors. The OS then generates configuration data and sends this data to the device 401 through the PCI hardware 403 (block 429). The PCI hardware 403 receives the configuration data and provides it to the device through a data message or similar communication at the device address (block 431). The device 401 receives the configuration data and sets the appropriate registers and settings in the device 401 accordingly (block 433). This may include the setting of base address registers to define the address space associated with the device. In one embodiment, after this point configuration is complete and the OS 405, PCI hardware 403 and device 401 continue on with their normal operation (block 435).

If further devices are present to be configured, then this process restarts with the next device which will be accessible through the common configuration MMIO address. The process may repeat until all of the devices in the system are configured and ready for operation (blocks 437, 439 and 441). The process may be reinitiated at any time when a device is added, allowing for hot-plugging of devices into the PCI system.

Figure 5:
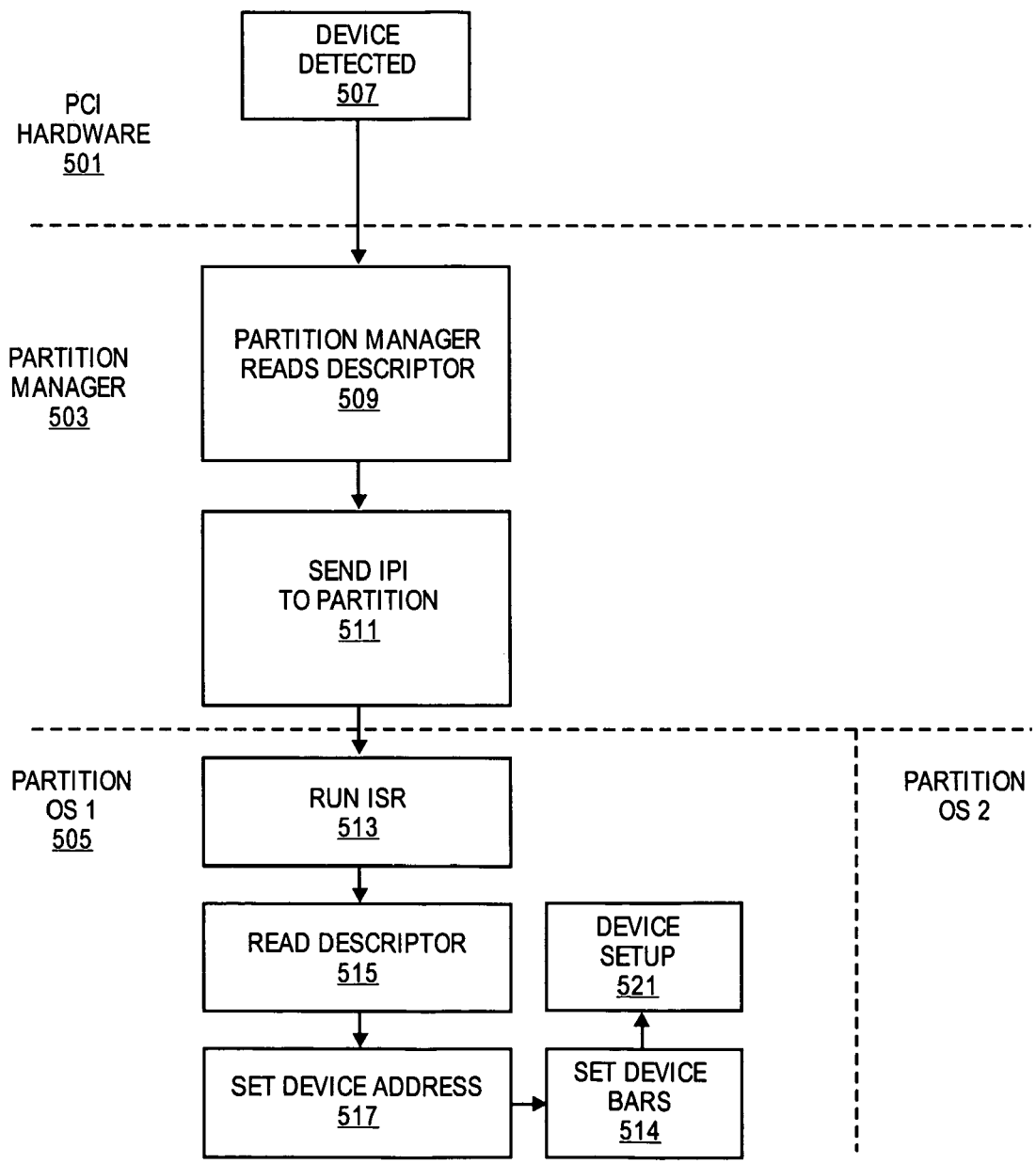
FIG. 5 is a diagram of one embodiment of a process for configuring devices in a partitioned computer system with a PCI type interconnect system.

FIG. 5 is a diagram of one embodiment of a process for supporting partitioning with a PCI type system. In many aspects, this process is similar to the single-partition supporting embodiment. Thus, some intermediate steps have been omitted for clarity. The process may be initiated by the detection of a device by the PCI hardware 501 (block 507). In one embodiment, the PCI hardware 501 may notify the partition manager 503 of the detection of the device. In another embodiment, the partition manager 503 may monitor a status register, poll the PCI hardware 501 or similarly monitor for detected devices.

The partition manager 503 may request and read the device descriptor data from the device at the common configuration MMIO address (block 509). The partition manager 503 analyzes the descriptor data to make a determination of which partition the device should be associated with the determinate may be made based on device type partition needs, requirements, user input or similar factors. In one embodiment, the partition manager 505 has sole or primary control over partition management. In another embodiment, the OS 505 and other applications from each partition or at least one partition may determine the assignment or negotiate the assignment of devices with the partition manager. The partition manager 503 may generate an interrupt, such as an inter-partition interrupt (IPI) for the OS 505 of the partition to which the device is to be assigned or a similar type of inter-partition communication such as a non-maskable interrupt (NMI), system management interrupt (SMI) or similar communication (block 511).

The partition OS 505 runs an ISR or similar routine dependent on the OS to clear and handle the interrupt (block 513). Any OS 505 may be running in a given partition. Different operating systems may be executing in different partitions. The partition OS 505 reads the descriptor to identify the device (block 515). The OS then sends a device address to the device (block 517). The partition OS 505 also configures the device including setting the boundaries of the address space assigned to the device by setting the base address registers (BAR) of the device (block 519). The OS 505 also completes configuration of the device for operation (block 521).

In one embodiment, using conventional PCI where TLPs are not available, a TLP is emulated using multiple reads and writes to a MMIO location. For example, instead of sending a "config request" TLP, the PCI controller repeatedly reads a well known MMIO location. The device responds with a descriptor. Similarly, the "set address" TLP request is sent to the well known location. This "set address" then becomes the device's new address. A PCI type controller then sends subsequent TLP commands to this address by writing to this address. Also the PCI type controller can read responses from the device by reading the new address. The device then responds to reads and writes to that address. The reads and write TLPs may be delimited by a header and CRC bit-pattern determined by a standard, like the PCI standard.

The partition support and single partition embodiments, simplify PCI implementation by eliminating the need for dedicated configuration packets or cycles. All data may be transmitted as standard message packets or transactions or control packets or transactions. Similarly, because each device is available at a known MMIO address, the need for (bus, device, function) type addressing is avoided, further simplifying the PCI system. Device information is stored in descriptors thereby eliminating the need for configuration space or the scanning of configuration space. Also, the embodiments described herein allow device discovery time to be proportional to the number of devices, thereby improving boot up times. The embodiments also support hot-plugging of items, because the system does not require that the devices be present at system boot up.

In one embodiment, specialized message packets or transactions may be implemented to support the embodiments of the invention including: set address, read descriptor and set power state types of packets and transactions. Device configuration and power management is thus supported by standard non-configuration packets and transactions.

Figure 7A:
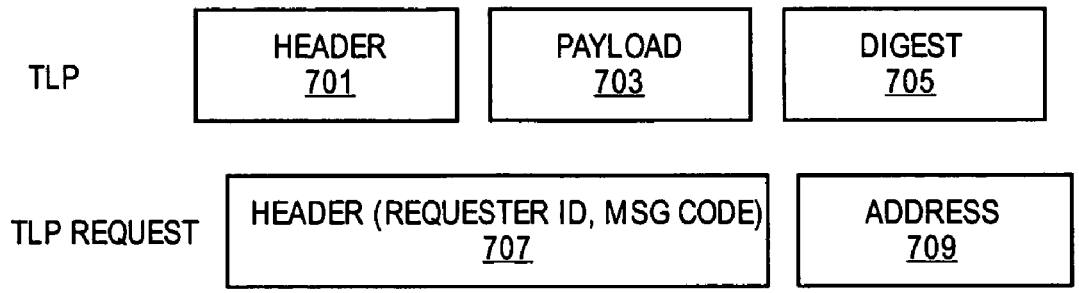
FIG. 7A is a diagram of a format of a transaction layer packet.

FIG. 7A is a diagram of one embodiment of the format of a transaction layer packet (TLP). The standard TLP may include a header 701, a payload 703 and a digest 705. A TLP request packet may include a header 707 containing a requester ID and a message code. Message codes may include set configuration, read configuration descriptor, set address, read detailed configuration, set power state, reset device and similar message codes. The read configuration message code may indicate that device characteristics are to be read from the device. The set address code accompanies an MMIO address that a device is to use. A set configuration message code accompanies data for setting registers or modes of a device. The read detailed configuration message code indicates that data beyond the standard configuration data is to be retrieved from a device. A set power state message code may be used to indicate that the power state or similar mode of a device is to be set. Similarly, a reset message code indicates that target device is to be reset. The TLP request may also include an address section 709.

Figure 7B:
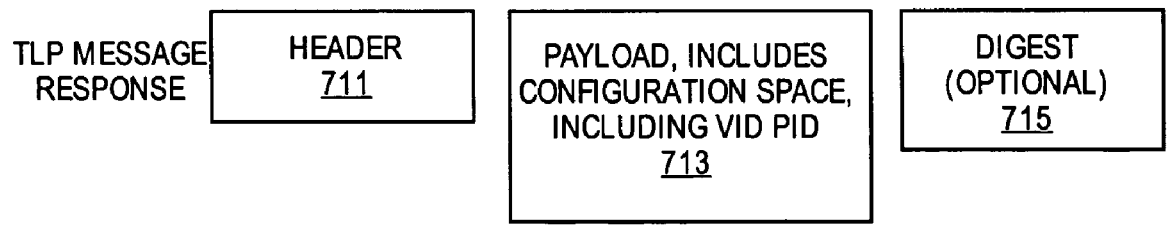
FIG. 7B is a diagram of another embodiment of a transaction layer packet.

FIG. 7B is a diagram of a format of a TLP response message. A response message may include a header section 711 and a payload section 713. A digest section may be optional 715. The payload section may store the equivalent to a configuration space for a responding device including the vendor identification number (VID) and the peripheral identification number (PID) for the device.

In one embodiment, in addition to the use of standard configuration space or descriptor data, additional configuration structures may be defined that include device classes (e.g. a disk class), device sub-classes (e.g. a flash disk subclass), serial numbers, power requirements and similar data. In one example embodiment, a per-device class configuration structure may be defined. A TLP message may be defined that contains device configuration data, that the device sends to the PCI type controller in response to a read configuration TLP request.

The embodiments support multiple partitions and scale to support any number of partitions. Any OS or set of operating systems may utilize the partition. The partition manager ensures that only the desired OS has access to the designated resources. In one embodiment, the partition manager may also support shifting resources and devices between operating systems and partitions during operation.

In one embodiment, the device detection and configuration process may be implemented partially or entirely as hardware devices, such as application specific integrated circuits (ASICs). In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   determining that a first device is attached to peripheral component interconnect (PCI) type interconnect;
   transmitting a first message to the first device at a predetermined address to retrieve a first device descriptor from the first device, without scanning a configuration space;
   determining a device address for the first device;
   transmitting a second message to the first device to set the device address for the first device; and
   receiving a message having the first device descriptor from the first device prior to sending another message to the first device and prior to scanning a configuration space of the first device.

2. The method of claim 1, further comprising:
   performing a tree walk to detect attached devices.

3. The method of claim 1, wherein the first message is a transaction layer packet.

4. The method of claim 1, wherein the second message contains a base address register setting.

5. The method of claim 1, wherein the first device responds to the first message by sending a message having a device descriptor that includes data identifying the first device and capabilities of the first device.

6. The method of claim 1, wherein the predetermined address is a memory mapped input/output address.

7. The method of claim 1, further comprising:
   receiving one of a request for detailed device characteristics, a power state request and a reset device request.

8. The method of claim 1, wherein the second message is a set address message, the set address message assigning the device address and automatically vacating the predetermined address.

9. The method of claim 1, further comprising:
   determining a partition based on the first device descriptor.

10. The method of claim 1, wherein the PCI type interconnect is one of a conventional PCI, PCI-X or PCI-e system.

11. An apparatus comprising:
    a detection component to detect that a first device is attached to a peripheral component interconnect (PCI) type interconnect; and
    a messaging component in communication with the detection component, the messaging component to transmit a first message packet to the first device at a common configuration address to retrieve a descriptor packet, the messaging component to transmit a second message packet to the first device to set a device address, and the messaging component to receive a message having the descriptor packet from the first device prior to sending another message to the first device and prior to scanning a configuration space of the first device.

12. The apparatus of claim 11, further comprising:
    the first device to respond to the first message packet with the descriptor packet including capabilities of the first device.

13. The apparatus of claim 11, further comprising:
    a partition manager to determine a partition for each device on the PCI type interconnect a PCI or PCI-e bus.

14. The apparatus of claim 11, wherein the PCI type interconnect is one of a conventional PCI, PCI-X or PCI-e.

15. A system comprising:
    a partition manager to determine a device partition assignment;
    an interrupt controller to receive and propagate interrupts from system components;
    a PCI type controller coupled to the partition manager, the PCI type controller to configure devices on a PCI type interconnect, the PCI type controller to detect each attached device, the PCI type controller to retrieve a descriptor from each attached device at a designated address and to assign a device address to each attached device, without scanning a configuration space; and the PCI type controller to receive a message having the descriptor from each attached device prior to sending another message to each attached device and prior to scanning a configuration space of each attached device.

16. The system of claim 15, further comprising:
    a memory controller coupled to the PCI type controller.

17. The system of claim 16, wherein the PCI type controller generates an system management interrupt upon detection of an attached device.

18. A machine readable medium having stored therein a set of instructions, which upon execution cause a computer to perform a set of operations comprising:
    detecting an attached first device;
    retrieving a descriptor from the first device at a common memory mapped input/output address;
    assigning a device address to the first device; and
    receiving a message having the descriptor from the first device prior to sending another message to the first device and prior to scanning a configuration space of the first device.

19. The machine readable medium of claim 18, having further instructions stored therein which cause the computer to perform operations further comprising:
    retrieving detailed device descriptors; and
    setting an operating mode for the device.

20. The machine readable medium of claim 18, having further instructions stored therein which cause the computer to perform operations further comprising:
    determining a partition for the first device based on the device descriptor.

* * * * *